US00H002227H

(19) United States
(12) Statutory Invention Registration
Tamirisakandala et al.

(10) Reg. No.: US H2227 H
(43) Published: Dec. 2, 2008

(54) HIGH SPEED TITANIUM ALLOY MICROSTRUCTURAL CONVERSION METHOD

(75) Inventors: Seshacharyulu Tamirisakandala, Beavercreek, OH (US); Prasad VRK Yellapregada, Bangalore (IN); Steven C. Medeiros, Beavercreek, OH (US); William G. Frazier, Oxford, MS (US); James C. Malas, Bellbrook, OH (US)

(73) Assignee: The United States of America as represented by the Secretary of the Air Force, Washington, DC (US)

(21) Appl. No.: 10/295,550

(22) Filed: Nov. 13, 2002

Related U.S. Application Data

(60) Provisional application No. 60/356,040, filed on Feb. 11, 2002.

(51) Int. Cl.
*C22F 1/18* (2006.01)

(52) U.S. Cl. ..... 148/671

(58) Field of Classification Search ..... 148/668–672, 148/421; 72/342
See application file for complete search history.

(56) References Cited

U.S. PATENT DOCUMENTS 3,635,068 A * 1/1972 Watmough et al. ..... 72/342.8
4,729,546 A * 3/1988 Allison ..... 251/368
5,904,062 A * 5/1999 Semiatin et al. ..... 72/253.1

FOREIGN PATENT DOCUMENTS

JP 02-093050 * 3/1990
JP 04-218649 * 10/1992

* cited by examiner

*Primary Examiner*—Dan Pihulic
(74) *Attorney, Agent, or Firm*—AFMCLO/JAZ; Richard A. Lambert

(57) ABSTRACT

A high speed titanium alloy microstructural conversion method from lamellar to equiaxed is disclosed. The method includes identification and estimation of process parameters such that the average strain rate is between about 1–100 $s^{-1}$ and the deformation temperature of the material is in the range of about 975°–1010° C.

3 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Ti-6Al-4V Conversion Window

Prior Art 100

New Processing Window 10

PRIOR ART

HIGH SPEED TITANIUM ALLOY MICROSTRUCTURAL CONVERSION METHOD

The present application is related to and claims priority on prior copending provisional Application No. 60/356,040, filed Feb. 11, 2002, entitled High Speed Titanium Alloy Microstructural Conversion Method.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to titanium alloy processing and more specifically to a novel high speed microstructural conversion method for converting Ti—AL—4V from lamellar to equiaxed morphology.

Among all titanium alloys, Ti—6Al—4V is the most widely used and accounts for the majority of applications. The mechanical properties of this alloy are very sensitive to its microstructure which, in turn, is significantly influenced by deformation processing. Since the resistance to fatigue crack initiation of equiaxed $\alpha+\beta$ microstructure is about two times higher than that of lamellar, equiaxed $\alpha+\beta$ microstructure is preferred for use in rotating components such as turbine disks. But, this requires a conversion process to be performed to convert the microstructure from lamellar to equiaxed.

Microstructural conversion from lamellar to equiaxed $\alpha+\beta$ is the most critical and time-consuming step in the processing sequence and is conventionally achieved using a series of hot forging steps in the $\alpha+\beta$ phase field. Since hot working at faster speeds produces microstructural defects such as adiabatic shear bands, cracking, and lamellae kinking, conventional forging speeds are limited to a strain rate of about 0.1/s. In addition, the occurrence of undesirable microstructures at slow speeds demands precise temperature control over a narrow range, which is difficult to achieve under complex manufacturing conditions.

The prior art conversion method in common use today consists of several steps of extensive deformation in the $\alpha+\beta$ temperature range to obtain desired microstructure and product dimensions. In view of the occurrence of microstructural instabilities that result from processing at high speeds (e.g. cracking, adiabatic shear banding, lamellae kinking etc.), this prior art conversion method is performed at slow speeds using machines such as hydraulic presses. Temperature control is critical and the occurrence of strain induced porosity has been a major problem because the temperature often falls below a safe limit during processing. Deformation at high temperatures, close to the $\beta$ transus ($\alpha+\beta\rightarrow\beta$ transformation temperature), on the other hand, will result in a $\beta$ transformed microstructure and the purpose of conversion will be lost. Therefore, the conventional, prior art conversion process is not only slow from a manufacturing view point, it also demands precise temperature control over a narrow range which is difficult to achieve in large components.

A need exists therefore for an improved process for microstructural conversion which is not only faster than the prior art process but also provides good microstructural control. Such a process would provide improved conversion results and be simpler to implement.

SUMMARY OF THE INVENTION

Accordingly, it is a primary object of the present invention to provide a high speed titanium alloy microstructural conversion method overcoming the limitations and disadvantages of the prior art.

Another object of the present invention is to provide a high speed titanium alloy microstructural conversion method producing an alloy material having superior mechanical properties.

Yet another object of the present invention is to provide a high speed titanium alloy microstructural conversion method that is simpler to control than the methods of the prior art.

These and other objects of the invention will become apparent as the description of the representative embodiments proceeds.

In accordance with the foregoing principles and objects of the invention, a high speed titanium alloy microstructural conversion method is described. The method departs significantly from the conventional, prior art process by incorporating high strain rates in the range of 1–100 $s^{-1}$ at temperatures close to the $(\alpha+\beta)\rightarrow\beta$ transformation temperature.

The method of the present invention includes the selection of process parameters chosen in order to facilitate a high speed extrusion process for converting the microstructure of a metallic alloy from lamellar to equiaxed. The parameters are based upon the type of metalworking process and alloy chemistry. More specifically, the average strain rate is estimated and should be between about 1–100 $s^{-1}$. The adiabatic temperature rise that occurs during high speed deformation is estimated such that the temperature of the workpiece after applying the adiabatic heating correction should be in the range of about 975–1010° C. and should not exceed the $\beta$ transus at any location. The deformation temperature is estimated by incorporating the adiabatic temperature rise calculated above as well as the effect of chemical composition upon the $\beta$ transus temperature. Based upon the results of the above calculations, the billet of material is heated, placed in a press, extruded, and allowed to cool.

BRIEF DESCRIPTION OF THE DRAWING

The accompanying drawing incorporated in and forming a part of the specification, illustrates several aspects of the present invention and together with the description serves to explain the principles of the invention. In the drawing.

DETAILED DESCRIPTION OF THE INVENTION

Figure 2A:
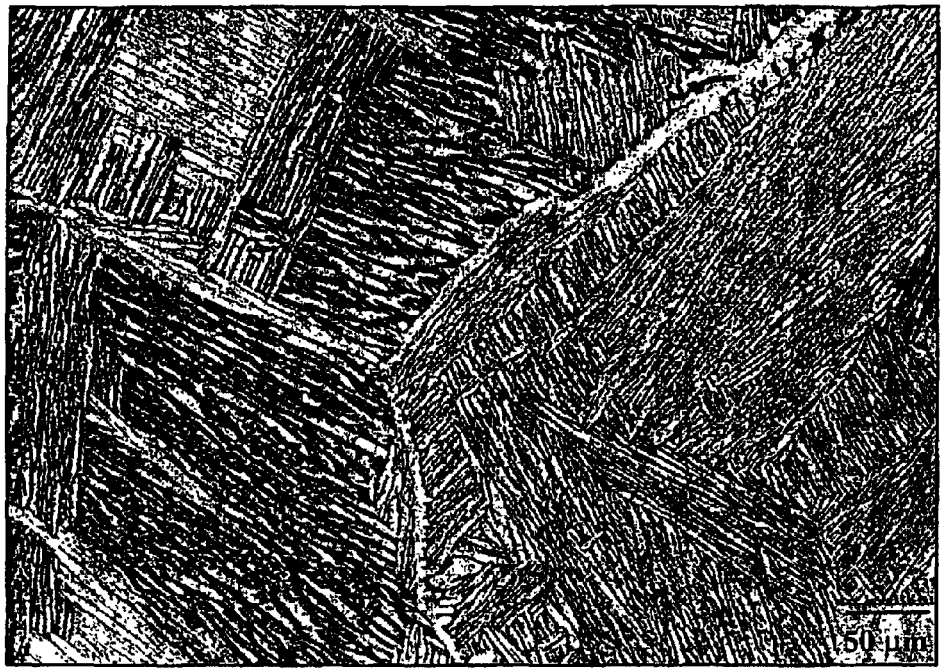
FIG. 2*a* is a diagrammatic representation of a lamellar microstructure.
Figure 2B:
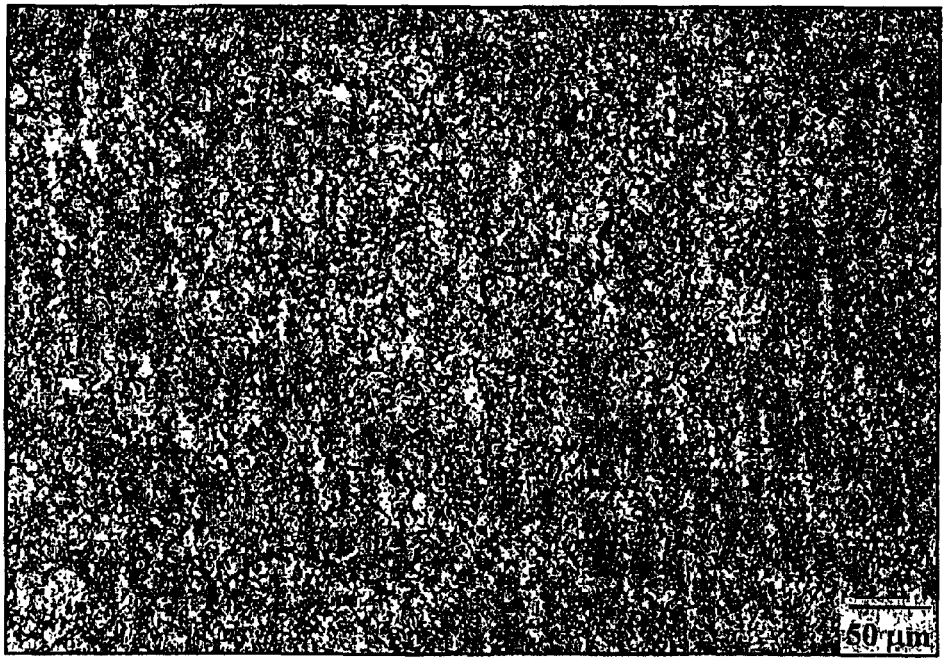
FIG. 2*b* is a diagrammatic representation of an equiaxed microstructure.

Among all titanium alloys, Ti—6Al—4V is the most widely used. However, the mechanical properties of this alloy are very sensitive to microstucture which, in turn, is significantly influenced by deformation processing. Since the resistance to fatigue crack initiation of equiaxed $\alpha+\beta$ microstructure is about two times higher than that of lamellar, an equiaxed microstucture, as shown diagrammatically in FIG. 2*b*, is preferred for use in rotating components such as turbine disks. Semi-products such as rods, plates, billets etc. for making these components are generally supplied in an equiaxed microstructural condition, which requires a conversion process to be performed in order to convert the microstructure from lamellar, shown diagrammatically in FIG. 2*a,* to equiaxed. Advantageously and according to an important aspect of the present invention, the high speed titanium alloy microstructural conversion method described herein represents a significant improvement over the prior art conversion method in use today and as will be shown, provides superior results.

Figure 4:
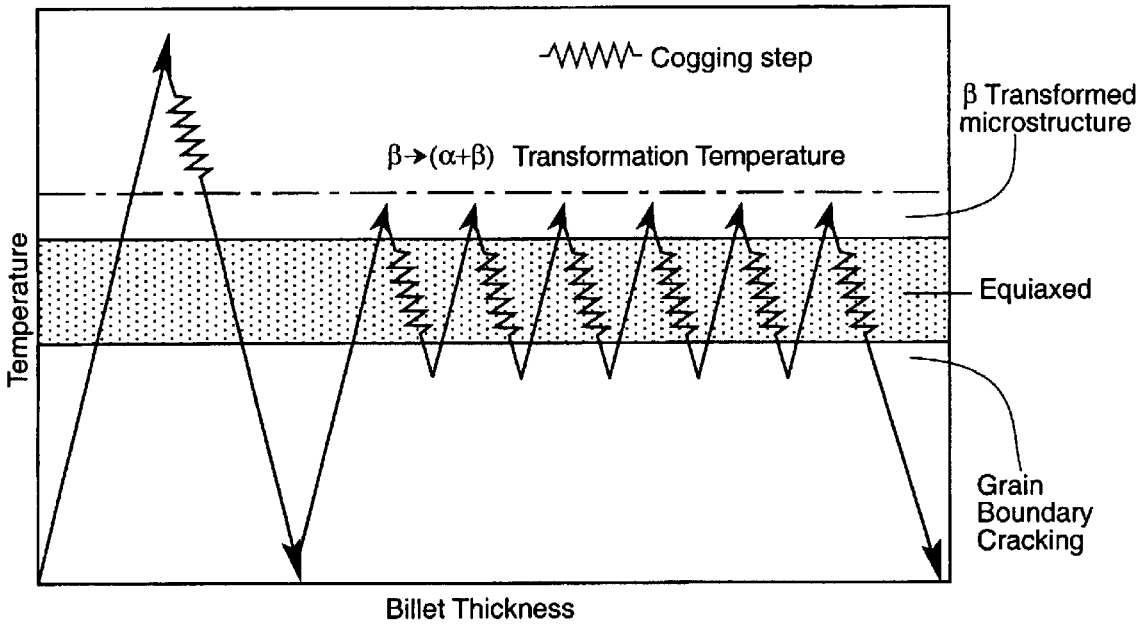
FIG. 4 is a graphical representation of the conventional, prior art microstructural conversion method.
Figure 4:
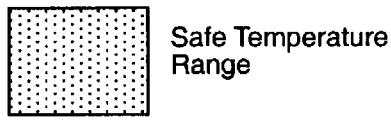

Reference is made to FIG. 4, a graphical representation of the conventional, prior art conversion process. As shown, several steps of extensive deformation are performed in the α+β temperature range to obtain desired microstructure and product dimensions. In view of the occurrence of microstructural instabilities at high speeds (e.g. cracking, adiabatic shear banding, lamellae kinking etc.), the conversion is performed at slow speeds using machines such as hydraulic presses, dramatically increasing processing time. Also, the occurrence of strain induced porosity has heretofore been a major problem because the temperature is difficult to maintain and often falls below a safe limit during processing. Conversely, deformation at high temperatures close to the β transus, will disadvantageously result in a β transformed microstructure, negating the utility of the conversion. Therefore, the prior art conversion process is not only slow from a manufacturing view point, it also demands precise temperature control over a narrow range which is difficult to achieve in large components especially during the extended conversion times mandated by the prior art process.

Figure 1:
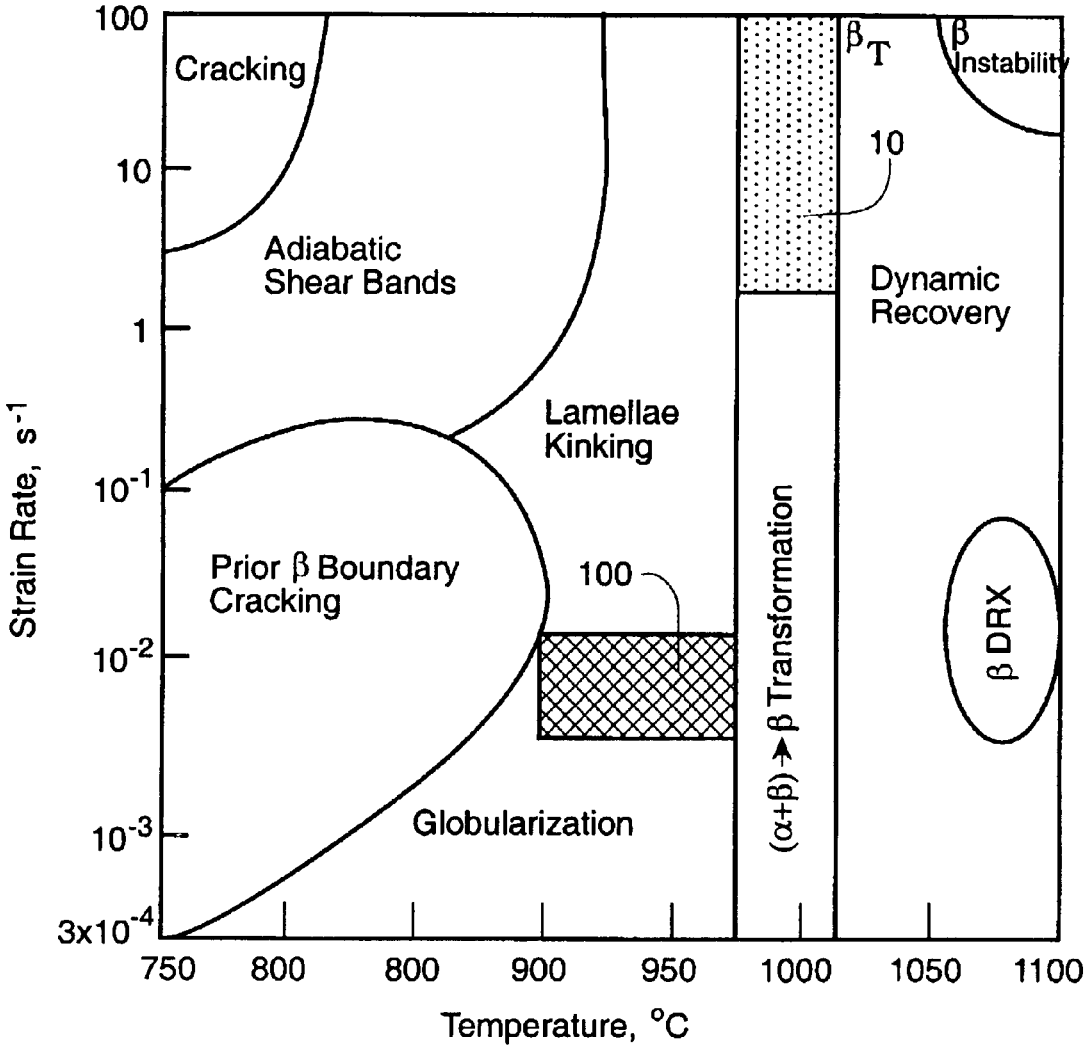
FIG. 1 is a microstructural deformation mechanism map for commercial grade Ti—6AL—4V with a lamellar $\alpha+\beta$ microstructure.

Reference is now made to FIG. 1, a microstructural deformation mechanism map for commercial grade Ti—6Al—4V, showing the new processing window 10 for performing the method of the present invention. The processing window for the prior art method is also shown at 100. As can be seen, the new processing window 10 incorporates high strain rates in the range of 1–100 $s^{-1}$ and at temperatures close to the (α+β)→β transformation temperature. Specimens processed within this new processing window 10 demonstrate fine equiaxed α+β microstructure. The mechanism by which equiaxed microstructure evolves in the method of the present invention is much different than that of conventional conversion. It is believed that the prior deformation significantly influences the kinetics of phase transformation that occurs during cooling, and this aspect is beneficially exploited in the method of the present invention. Deformation at high strain rates produces a large amount of dislocations in the matrix, which act as heterogeneous nucleation sites for a precipitation and lead to the formation of equiaxed grains. When deformed at slower strain rates, on the other hand, homogeneous precipitation of α occurs disadvantageously resulting in a fully lamellar α+β structure.

The high speed titanium alloy microstructural conversion method of the present invention incorporates the identification of several process parameters:

First, strain rate is estimated. Since the evolution of equiaxed microstructure is very sensitive to the strain rate, it is important that strain rate be estimated accurately. For reproducing the microstructure using the high speed processing window identified in this invention, the strain rate should be within the range of about 1–100 $s^{-1}$. Average strain rate calculations can be made using the simple equations specific to different metalworking processes. See, for example, G.E. Dieter, Mechanical Metallurgy, McGraw-Hill, 1986 pp. 503–678. Also, high accuracy simulation techniques such as finite element analysis can be used to predict the local strain rate variations in components with complex geometry.

Next, the adiabatic temperature rise that occurs during deformation at high speeds is estimated. Since the deformation temperature must be maintained within a preselected range, the adiabatic temperature rise must be accounted for such that the temperature of the workpiece after applying adiabatic heating correction should be in the range 975–1010° C. and should not exceed the β transus at any location. Local variations in the temperature of the workpiece can be estimated using finite element simulations to verify that they are within the range identified in this invention.

Next, the influence of alloy chemistry is determined. The chemical composition significantly influences the β transus and hence the temperatures for performing the method of the present invention. For example, a decrease in oxygen content from 0.18 wt % to 0.13 wt % reduces the β transus from 1010° C. to 975° C. See, Materials Properties Handbook: Titanium Alloys, ASM International, Materials Park, OH, 1994, p. 516. Therefore, the effect of alloy chemistry upon the β transus must be taken into account.

Lastly, the values obtained from the steps above are incorporated and a deformation temperature for the material is correspondingly estimated.

Figure 3:
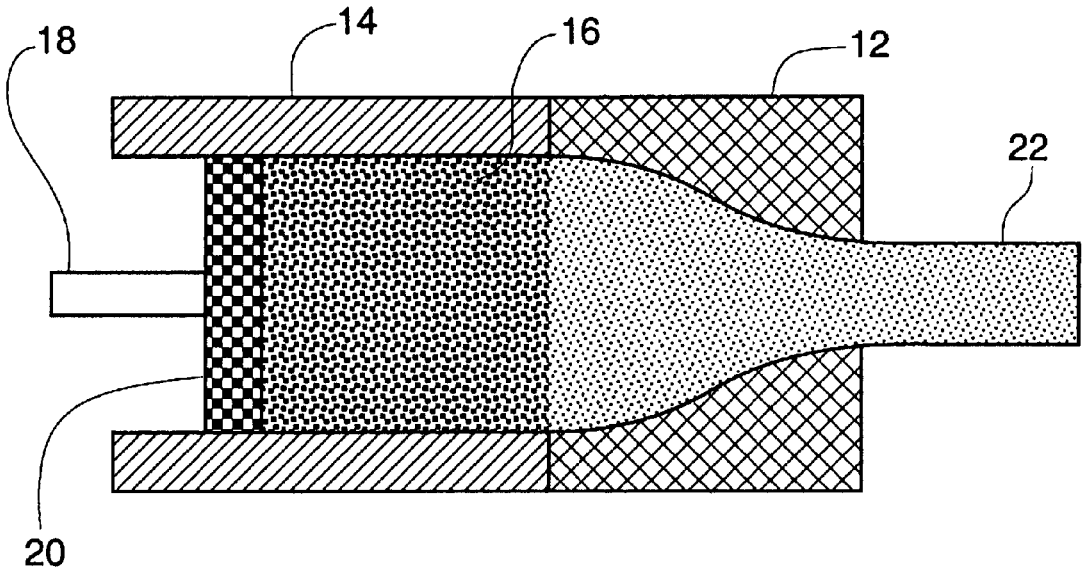
FIG. 3 is a generalized representation of an extrusion apparatus suitable for use in performing the method of the present invention.

The advantages of the high speed titanium alloy microstructural conversion method of the present are borne out dramatically by experimentation. For example, a high speed extrusion validation experiment was conducted using a 7000 kN capacity horizontal press. A generalized representation of a suitable extrusion apparatus is shown in FIG. 3. As shown, a streamlined die 12 is attached to a container 14. A billet of material 16 is placed within the container and is extruded through the streamlined die 12 by the forces exerted thereon by the ram 18 and carbon block 20. Extrusion process parameters were selected in light of the preceding descriptions such that the average strain rate and temperature fall within the new processing window 10. In this example, the streamlined die 12 was made of H-13 tool steel. An overall 6:1 extrusion ratio was used. The interior surfaces of the streamlined die 12 were coated with zirconia and a Necrolene lubricant available from CSM Industries, Coldwater, Mich. was used to minimize the die-billet friction. The inner surface of the container 14 was coated with Fiske 604 hot die lubricant available from Fiske Brothers Refining Company, Toledo, Ohio. The billet 16 dimensions were 75 mm diameter and 150 mm length with a 12.7 mm 45° chamfer at the nose. The billet 16 was coated with Deltaglaze 151, available from Acheson Colloids Company, Port Huron, Mich. for lubrication and environmental protection. Prior to extrusion, the billet 16 was subjected to β anneal at 1050° C. for 1 hour followed by air-cool to obtain fully lamellar starting microstructure. A ram speed of 100 mm $^{-1}$ was used and the average strain rate during extrusion was calculated using the relation $$\dot{\varepsilon} = \frac{6v_0 D_b^2}{D_b^3 - D_p^3}\ln(\Gamma) \tag{1}$$

where $v_0$: ram speed, $D_b$: billet diameter, $D_p$: product diameter, and Γ: extrusion ratio. By substituting the values in Eq. (1), the $\dot{\varepsilon}$ is estimated be about 15 $s^{-1}$. The extrusion process was simulated using a commercial finite element software DEFORM available from Scientific Forming Technologies Corporation, Columbus Ohio which revealed that the local strain rate variations are between 1–20 $s^{-1}$. The temperature rise ($\Delta T$) due to deformation heating is estimated using the energy balance equation $$\rho C_p \Delta T = \chi \bar{\sigma} \bar{\varepsilon} \quad (2)$$

where $\rho$ is the mass density, $C_p$ is the heat capacity per unit mass, $\chi$ is a coefficient which characterizes the fraction of plastic work that is converted into heat (usually taken constant and set equal to 0.95), $\bar{\sigma}$ is the effective stress, and $\bar{\varepsilon}$ is the effective strain. A billet temperature of 980° C. was selected considering the estimated adiabatic temperature rise of about 30° C. during deformation ($\bar{\varepsilon}$~1.8). The die 12 and the container 14 were preheated to 260° C. The billet 16 was soaked at 980° C. for 1 hour and quickly transferred to the press. Extrudate (shown generally at 22 ) was sectioned parallel to the extrusion direction and microstructural observations were made. Microstructures at different locations of the extrudate exhibited fine grained $\alpha+\beta$ structure. This experiment demonstrated that the equiaxed microstructure using new high speed process could be reproduced in larger components under complex manufacturing conditions.

Figure 5:
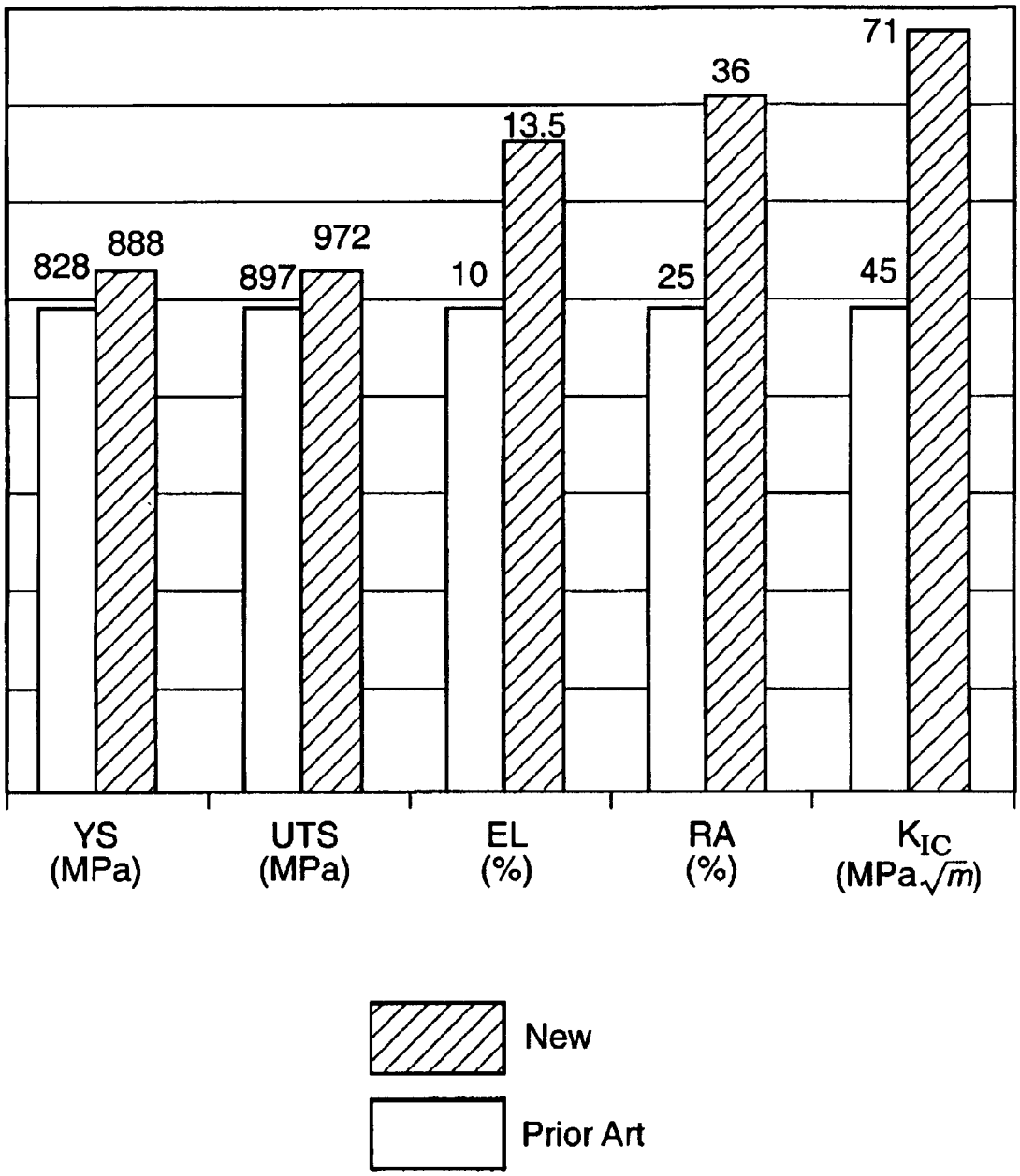
FIG. 5 is a graph illustrating the improved results obtained from the use of the method of the present invention versus the conventional, prior art method.

Reference is made to FIG. 5 graphically illustrating the tensile properties of Ti—6AL—4V obtained through the use of the method of the present invention, compared with the same material produced by the conventional conversion process. In FIG. 5, YS is Yield Strength, UTS is Ultimate Tensile Strength, EL is Elongation, RA is Reduction in Area and, $K_{IC}$ is Plane Strain Fracture Toughness. The room temperature tensile strength and ductility were evaluated by conducting tensile tests on cylindrical threaded specimens of 25-mm gage length and 4-mm gage diameter. Plane strain fracture toughness was evaluated using compact tension specimens of 19-mm thick in accordance with ASTM standard E 399. The tensile properties were averaged from four tests and are shown in FIG. 5. As shown, the microstructure of the material produced according to the method of the present invention exhibits higher strength as well as a 30% increase in ductility compared to the conventionally processed material. As a result of increase in strength as well as ductility, the plane strain fracture toughness of the new microstructure is considerably higher by about 55% than that obtained by following the conversion method of the prior art.

Advantageously, the high speed titanium alloy microstructural conversion method of the present invention offers numerous benefits over the prior art conversion method. For example, an increase in processing speeds by 100–10,000 times than the prior art method enables considerable increase in the production rates and large overall cost savings (e.g. few seconds of forging time vs. few hours in the prior art conversion method). The microstructure produced using the method of the present invention exhibits better mechanical properties compared to traditionally processed material. The method of the present invention offers better microstructural control without any defect formation. Due to very short contact times with the die, the method of the present invention offers better surface temperature control and eliminates the need for hot die or isothermal forging. A complex series of steps could be replaced with a single step, which brings additional cost savings. The method of the present invention can be implemented using common industrial metalworking equipment such as forge presses, rolling mills, and extrusion presses.

The entire teachings of all references cited herein are incorporated herein by reference.

In summary, numerous benefits have been described from utilizing the principles of the present invention. The high speed titanium alloy microstructural conversion method provides for high speed, low cost microstructural conversion of Ti—6Al—4V providing improved results over the prior art conversion methods in use today.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A method of converting a Ti—6 Al—4V alloy material microstructure from lamellar to equiaxed, comprising the steps of:

providing a lamellar microstruure Ti—6Al—4V alloy material;

processing said material in such manner to convert the microstructure thereof from lamellar to equiaxed, said processing step including the step of;

estimating an average high strain rate for said material;

estimating an adiabatic temperature rise within said material as a result of deformation at said strain rate;

determining the effect of chemical composition of said material upon the $\beta$ transus temperature;

estimating a deformation temperature by incorporating said adiabatic temperature rise from said adiabatic temperature rise estimating step above and incorporating the effect of chemical composition from said determining step above such that the temperature of the material is within the range of about 975–101° C., said deformation temperature further being chosen such that the $\beta$ transus temperature is not exceeded at any location within said material;

heating said material to the temperature obtained from said deformation temperature estimating step above; and, extruding said material at a rate obtained from said strain rate estimating step above.

2. A method of converting a Ti—6Al—4V alloy material microstructure from lamellar to equiaxed, comprising the steps of:

providing a lamellar microstructure Ti—6Al—4V alloy material;

processing said material in such manner to convert the microstructure thereof from lamellar to equiaxed, said processing step including the steps of;

estimating an average high strain rate for said material, said strain rate being in the range of about 1–100 $s^{-1}$;

estimating an adiabatic temperature rise within said material as a result of deformation at said strain rate;

determining the effect of chemical composition of said material upon the $\beta$ transus temperature;

estimating a deformation temperature by incorporating said adiabatic temperature rise from said adiabatic temperature estimating step above and incorporating the effect of chemical oomposition from said determining step above such that the temperature of the material is proximate the $(\alpha+\beta)\rightarrow\beta$ transformation temperature, said deformation temperature further being chosen such that the β transus temperature is not exceeded at any location within said material;

heating said material to the temperature obtained from said deformation temperature estimating step above; and, extruding said material at a rate obtained from said stain rate extimating step above.

3. A method of converting a Ti—6Al—4V alloy material microstructure from lamellar to equiaxed comprising the steps of:

providing a lamellar microstructure Ti—6Al—4V alloy material; processing said material in such manner to convert the microstructure of thereof from lamellar to equiaxed, said processing step including the steps of;

estimating an average strain rate for said material using the relation $$\dot{\varepsilon} = \frac{6v_0 D_b^2}{D_b^3 - D_p^3}\ln(\Gamma)$$

wherein $V_o$ is ram speed, $D_b$ is billet diameter, $D_p$ is product diameter, and Γ is extrusion ratio;

estimating an adiabatic temperature rise within said material as a result of deformation at said strain rate;

determining the effect of chemical composition of said material upon the β transus temperature;

estimating a deformation temperature by incorporating said adiabatic temperature rise from said adiabatic temperature rise estimating step above and incorporating the effect of chemical composition from said determining step above such that the temperature of the material is within the range of about 975–1010° C., said deformation temperature further being chosen such that the β transus temperature is not exceeding at any location within said material;

heating said material to the temperature obtained from said deformation temperature estimating step above; and, extruding said material at a rate obtained from said strain rate estimating step above.

* * * * *